United States Patent [19]

Gawrilow

[11] 4,137,338

[45] Jan. 30, 1979

[54] STABLE FLUENT EMULSIFIER CONCENTRATE CONTAINING SOLID PHASE EMULSIFIER COMPONENTS

[75] Inventor: Ilija Gawrilow, Strongsville, Ohio

[73] Assignee: SCM Corporation, New York, N.Y.

[21] Appl. No.: 747,296

[22] Filed: Dec. 3, 1976

[51] Int. Cl.² ............................................. A23D 5/00
[52] U.S. Cl. ................................... 426/601; 426/606; 426/612; 426/653; 426/654
[58] Field of Search ................ 426/24, 601, 604, 606, 426/612, 607, 653, 654; 252/356

[56] References Cited

U.S. PATENT DOCUMENTS

| | | | |
|---|---|---|---|
| 3,433,645 | 3/1969 | Egan et al. ............................ | 426/24 |
| 3,752,675 | 8/1973 | Tsen et al. ........................... | 426/24 X |
| 3,752,770 | 8/1973 | Buddemeyer ..................... | 426/653 X |
| 3,914,452 | 10/1975 | Norris ............................... | 426/601 X |
| 3,943,259 | 3/1976 | Norris ................................... | 426/24 |

Primary Examiner—Robert A. Yoncoskie
Attorney, Agent, or Firm—Richard H. Thomas

[57] ABSTRACT

This invention resides in the discovery of a fluent food emulsifier concentrate comprising a normally liquid partial glycerol ester food emulsifier vehicle in which is stably dispersed ethoxylated fatty acid esters and solid phase fine crystalline food emulsifier components, said concentrate being mechanically dispersible into a comestible mixture for the emulsification thereof. The present invention is particularly suitable for the preparation of a stable fluid shortening containing the emulsifier concentrate and a liquid edible oil suitable for bread and dough mixtures providing both dough conditioning and anti-staling properties. In an example of the present invention, the fluid concentrate comprises a fluent monoglyceride such as glycerol monooleate admixed with ethoxylated mono- and diglyceride and a solid phase ester emulsifier such as a succinylated mono- and diglyceride, or the alkali or alkaline earth metal salt of an acyl lactylate.

22 Claims, No Drawings

STABLE FLUENT EMULSIFIER CONCENTRATE CONTAINING SOLID PHASE EMULSIFIER COMPONENTS

The present invention relates to an emulsifier concentrate which is mechanically dispersible into a comestible mixture. The present invention is particularly applicable to the preparation of an emulsifier concentrate which is mechanically dispersible into a fluent edible oil to produce a liquid shortening, and will be described with reference thereto, although it will become apparent that the invention has other applications.

BACKGROUND OF THE INVENTION

Fluid shortenings are useful in the preparation of baked goods and bread-making processes. The function of fluid shortenings is similar to plastic shortenings in baking processes, but fluid shortenings are much preferred for use in commercial baking process due to their ease in handling, pumping, and metering.

In prior U.S. Pat. No. 3,943,259, to Max E. Norris and assigned to assignee of the present application, there is disclosed a fluid shortening which contains by weight about 4 to 14 parts of soft mono- and diglycerides, 2 to 8 parts of ester emulsifier, 0 to 8 parts of solid stearine, and at least about 40 parts of liquid vegetable oil. The fluid shortening is a stabilized dispersion in vegetable oil and is produced by melting a blend of the components at temperatures sufficient to force a melt, votating the blend at temperatures of about 82° to 86° F, and then stehling the votated mixture to obtain substantially 100 percent conversion to the stable beta-polymorphic form. The fluid shortening of this patent has the advantage, among others, that it possesses a stabilized fluid consistency the viscosity of which remains relatively constant over a wide temperature range.

One problem is that it may be desirable in certain instances to save on shipping costs by shipping only the emulsifier components and other shortening ingredients absent the vegetable oil to a point of further processing where such components or ingredients then may be blended into the vegetable oil. Such different points of further processing, however, may not possess the stehling equipment and capabilities necessary to permit further processing. Alternatively, it may be desirable to ship the emulsifier components absent the vegetable oil to a point of use where the emulsifier components are added directly to a comestible mixture, such as a bread or dough mix.

Thus, one object of the present invention is to provide an emulsifier concentrate which is stable and can be stored and shipped, and which at the same time can be readily blended with a liquid edible oil, such as a vegetable or animal derived oil, to provide a fluid shortening, without the necessity of subsequent stehling. It is also an object of the present invention to provide an emulsifier concentrate which, when blended with a liquid vegetable oil, or when added directly to a comestible mixture, provides all of the functionalities normally required of a shortening.

It is known to provide an emulsifier concentrate having more than one emulsifying ingredient, as different emulsifiers have different functionalities. United States patent No. 3,785,993, to Roy Kenneth Langhans, discloses a clear emulsifier composition said to be useful for yeast-raised products. The composition comprises a glycerol partial ester as a softener, a polyoxyethylene ester of a glycerol, hexitol, hexitan or isohexide as a conditioner, and propylene glycol, water, ethanol or an edible oil as a clarifying agent. The patent does not disclose or suggest the preparation of a fluent emulsifier suspension or concentrate which has a solid phase emulsifier component therein. A similar disclosure is contained in Langhans U.S. Pat. No. 3,859,445.

U.S. Pat. No. 3,180,736, to Bert W. Landfried, discloses an emulsifier composition containing mono- and diglycerides combined with a fatty acid lactylate. In an example, stearyl-2 lactylic acid was melted with glyceryl mono stearate at a temperature of 70° C, and water at 50° C was then added to the melt and stirred to form an oil and water emulsion. This was cooled to become a firm plastic solid. The patent does not suggest nor teach the preparation of a fluent concentrate.

U.S. Pat. No. 3,870,799, to Ralph J. Tenney, teaches the preparation of a hydrated admixture containing 20–80% water, an alkali or alkaline earth metal salt of the acyl lactylates of $C_{14}$-$C_{22}$ fatty acids and ethoxylated mono- and diglycerides of the $C_{14}$-$C_{22}$ fatty acids. It is indicated that these admixtures are prepared by heating the acyl lactylate salts and the ethoxylated mono- and di-glycerides at 60° C until the lactylate salts melt followed by addition of 60° C water and cooling to form a plastic solid. As with United States patent No. 3,180.736, there is no suggestion nor teaching in this patent of the preparation of a fluent concentrate.

BRIEF SUMMARY OF THE INVENTION

The present invention resides in the discovery of a fluent emulsifier concentrate blend which comprises a normally liquid partial glycerol ester food emulsifier vehicle having stably dispersed therein ethoxylated fatty acid esters and solid phase fine crystalline food emulsifier components, said concentrate being mechanically dispersible into a comestible mixture for the emulsification thereof.

By "stably dispersed", it is meant that the solid phase emulsifier components remain at least in part in suspension and in solid phase in the partial glycerol ester vehicle, whereas the ethoxylated fatty acid esters may or may not be in suspension. That is, they may be in whole or in part dissolved in the emulsifier vehicle.

In a particular embodiment of the present invention, the fluid concentrate is mechanically dispersible into an edible oil, such as a vegetable or animal derived oil, in the preparation of a fluid shortening suitable for bread and dough mixes providing improved anti-staling and dough conditioning properties.

The liquid partial glycerol esters useful in accordance with the concepts of the present invention include both pure monoesters of glycerin and mixtures of monoesters and diesters of glycerin. They are generally a mixture of unsaturated and saturated glycidyl esters of fatty acids typically derived from hydrogenated and non-hydrogenated vegetable oils such as soybean oil, corn oil, olive oil, peanut oil, safflower oil, cottonseed oil, palm oil and like vegetable oils, and animal fats such as tallow and lard. The ratio of monoglycerides to diglycerides in conventional mono- and diglycerides typically is about 40 to 60 weight percent monoglyceride to about 35 to 45 weight percent diglyceride and minor amounts of 5 to 14 percent triglycerides. They have an iodine value in the broad range of about 40 to 150 although the mono- and diglycerides derived from vegetable oils preferably have an iodine number between about 65 to 150. The preferred iodine number range of the mono- and diglycerides is between about 40 and 85. They are fluid in consistency. The acid number of the mono- and diglycerides is less than 2 and the peroxide value should be less than 1 in accordance with conventional specifications of mono- and diglycerides commercially available.

Specific mono- and diglycerides within the scope of the present invention include glycerol monooleate (GMO). One glycerol monooleate useful in the present invention is "Emrite 6009", trademark Emery Industries, comprising mono- and diglycerides of food grade oleic acid said to have an iodine value of at least 60, at least 46% alpha monoglyceride, less than 7% free glycerin, and 9.5% propylene glycol. A similar glycerol monooleate is marketed by ICI United States, Inc. under the trademark "Atmos 300" said to contain about 12% propylene glycol. Preferably about 8-12% propylene glycol is present in the partial glycerol ester component.

The class of ethoxylated fatty acid esters useful in the concentrate of the present invention are the ethoxylated fatty acid esters of glycerol, hexitol, hexitan and isohexide, as well as the fatty acid esters of ethoxylated glycerol, hexitol, hexitan and isohexide. A preferred class of compounds for use in the concentrate of the present invention are the ethoxylated monoand diglycerides, which are the polyethoxylated fatty acid esters of glycerol, and may be conventionally described as a mixture of stearate, palmitate, and lesser amounts of myristate partial esters of glycerin condensed with about 18 to 22 moles, preferably about 20 moles, of ethylene oxide per mole of alpha-monoglyceride reaction mixture such as set forth in The Food Codex and FDA Regulations, and more particularly as set forth in the Egan patent, U.S. Pat. No. 3,433,645, incorporated herein by reference. The fatty acid radicals of ethoxylated monoglycerides preferably are higher fatty acid chains having about 12 to 18 carbon atoms.

Representative fatty acid mono- and diesters of glycerin from which the ethoxylated monoglycerides are derived are glycerol monostearate, glycerol distearate, glycerol monopalmitate, glycerol dipalmitate, glycerol monooleate, glycerol dioleate, and others.

One suitable ethoxylated mono- and diglyceride that may be employed in the present invention is Santelle EOM (Trademark) marketed by Glidden-Durkee Division of SCM Corporation. This emulsifier is manufactured from hydrogenated vegetable oils and has an acid value maximum of 2.0, an hydroxyl value of 60-80, an IV number based on fatty acid content of 3 maximum and an oxyethylene content of 60.5–65.0%.

Preferably, the ethoxylated monoglycerides for this invention have an hydroxyl value of about 65 to 80, a saponification number of about 65 to 75, acid values less than about 2, and an oxyethylene content of about 60 to 65 weight percent based on the total ethoxylated glycerides composition. The capillary melting point of ethoxylated mono- and diglycerides is between about 75° to 95° F and preferably between about 80° to 90° F. Ethoxylated monoglycerides may be prepared by reacting ethylene oxide with a mono- and diglyceride mixture at temperatures of about 125° to 175° C, such as suggested in the Egan patent, U.S. Pat. No. 3,490,918, and incorporated herein by reference.

Representative of other polyoxyethylene-containing fatty acid esters useful in the present invention are the polysorbates (polysorbate 60) such as polyoxyethylene sorbitol distearate, polyoxyethylene sorbitan monostearate, polyoxyethylene isosorbide monopalmitate, polyoxyethylene sorbitan distearate, polyoxyethylene isosorbide monooleate, polyoxyethylene sorbitol, trilaurate, polyoxyethylene sorbitan dibehenate, polyoxyethylene isosorbide monolinoleate, polyoxyethylene sorbitan monolaurate, ethoxylated propylene glycol monoesters, polyoxyethylene mannitan monooleate, polyoxyethylene sorbitan monopalmitate, polyoxyethylene sorbitol oleate, as well as other similar ethoxylated fatty acid esters of ethoxylated hexitols, hexitans, and isohexides.

The solid phase crystalline food emulsifier component can be any beta-forming emulsifying ingredient which remains in whole or in part suspended and in solid phase form in the glycerol monooleate, in the presence of the ethoxylated fatty acid esters, in the proportions as defined herein. For purposes of the present application, the term "beta-forming" describes the predominant crystal form adopted by the solid phase component on rapid chilling of the concentrate system from a melt form at an elevated temperature, followed by agitation for a prolonged period of time to develop and maintain a homogeneous dispersion of the desired beta-crystals in the fluid concentrate, in accordance with techniques known in the art.

Examples of functional solid phase fine crystalline food emulsifier components, which are beta-forming, are an alkali or alkaline earth metal salt of an acyl lactylate, or alternatively a succinylated mono- and diglyceride. The fatty acid lactylates and process for their manufacture are described in detail in U.S. Pat. No. 2,733,252, assigned to C. J. Patterson Company. The subject matter of this patent is incorporated by reference herein. Preferably, these compounds are the acyl lactylates of $C_{14}$-$C_{22}$ fatty acids. The two most common such compounds are sodium and calcium stearoyl-2-lactylate, known as "Emplex" and "Verv" (Trademarks) marketed by C. J. Patterson Company. Both are described in the Food Chemicals Codex, Second Edition, 1972 (National Academy of Sciences, Washington, D. C.) on pages 160 and 770, and can be prepared by admixing lactic acid in an aqueous medium with commercial stearic acid (an admixture of myristic, palmitic and stearic fatty acids) at a sufficiently elevated temperature to cause a condensation reaction to occur. Other examples of the sodium stearoyl-2-lactylate are "Artodan SP 50" marketed by Grinsted Corp. and "Stearolac S450" marketed by The Paniplus Company. Specific procedures for producing the lactylates, of which the number 2 indicates the average number of lactyl groups on the molecule, are set forth in U.S. Pat. No. 2,789,992, insofar as the sodium stearoyl-2-lactylate ester is concerned, and the aforementioned U.S. Pat. No. 2,733,252, which describes both the preparation of sodium stearoyl-2-lactylate from stearic acid, sodium hydroxide, carbonate or bicarbonate and lactylic acid, and also sets forth the parameters for the production of the calcium lactylate composition. The disclosures of the "Food Chemicals Codex" publication and the U.S. Pat. No. 2,789,992 are also incorporated by reference herein.

Particular reference can be had to the Food and Drug Administration Regulation Title 21, Section 121.1211, on sodium stearoyl-2-lactylate. This compound is said to be a mixture of sodium salts of stearoyl lactylic acid and minor proportions of other sodium salts of related acids, manufactured by the reaction of stearic acid and lactic acid and conversion to the sodium salts. This emulsifier meets the following specifications:

Acid Number: 60–80
Sodium Content: 3.5%–5%
Lactic Acid Content: 31%–34%
Ester Number: 150–190

The manufacture of succinylated mono- and diglycerides is disclosed in U.S. Pat. No. 3,370,958, assigned to National Dairy Products Corporation, incorporated by reference herein. These compounds are also described in Food and Drug Administration Regulation, Section 121.1197. It is stated that they are a mixture of half succinic acid esters of mono- and diglycerides produced by the succinylation of a product obtained by the glycerolysis of edible fats and oils or by the direct esterification of glycerol with edible fat-forming fatty acids. They have a succinic acid content of 14.8 to 25.6%, a melting point of 50° C to 60° C and an acid number of 70–120.

The foregoing described partial glycerol ester, ethoxylated fatty acid esters and solid phase ester components are contained in the fluid concentrate in a wide range of weight ratios, preferably varying from about 10% to about 70% glycerol ester to about 90–30% of other emulsifier components including the solid phase ester emulsifiers. A preferred formulation comprises about 10 to about 70 weight percent liquid partial glycerol ester, about 15 to about 72 weight percent ethoxylated fatty acid ester, the remainder being essentially normally crystalline food emulsifier, the ratio of solid phase ester emulsifier to ethoxylated fatty acid ester not exceeding about 1.5, the proportions being such as to produce a fluent cloudy suspension. By "fluent" it is meant flowable or pumpable. By "cloudy" it is meant other than clear. In the case of the use of an acyl lactylate salt, the ratio of such salt to ethoxylated fatty acid ester should not exceed about one. A preferred formulation comprises about 40% glycerol monooleate vehicle in which is suspended and dissolved 30% sodium stearoyl-2-lactylate and about 30% ethoxylated mono- and diglyceride, to provide a cloudy, viscous but flowable or pumpable concentrate.

Another suitable formulation in accordance with the concepts of the present invention comprises about 10% glycerol monooleate vehicle in which is suspended or dissolved about 45% ethoxylated mono- and diglyceride and about 45% succinylated mono- and diglyceride.

Preferably, the emulsifier concentrate is processed by physically, uniformly blending the respective emulsifier components at about 130–150° F, sufficient to liquify all of the components, using a high speed mixer. The concentrate is then subjected to rapid indirect chilling or nucleating to initiate beta-crystal formation within the concentrate, and then is mildly agitated and mixed following known procedures or techniques to permit the substantially complete development of the desired beta-crystal form of the beta-phase forming emulsifier component.

In a preferred procedure, the concentrate is subjected to quick chilling in a swept-surface heat exchanger such as a Votator "A" type unit chilling machine as described in detail in U.S. Pat. No. 3,011,896. The primary function of the Votator "A" unit is to quick-chill the concentrate to initiate the formation of beta-crystals. The chilled blend is then passed to a Votator "B" unit wherein the blend is mildly agitated or worked to produce a product of desired consistency. The primary function of the "B" unit is to allow the beta-crystallization to further develop. The exit temperature of the "B" unit should be maintained between about 70° F and about 100° F. As the "B" unit has no cooling capability, the "A" unit exit temperature is maintained in whatever range is necessary to achieve the desired "B" unit exit temperature.

Following votation, the resulting stable fluent concentrate is subjected to a prolonged mild agitation for an extended period to achieve substantially complete conversion to or development of the beta-crystal form, on the order of at least 90% conversion, and preferably 95 to 100% conversion. This agitation may be carried out for a period of from about 18 to 48 hours, and is carried out at a temperature in the range of about 70–100° F, preferably ambient temperature or about 75–85° F. The agitation may, if desired, be carried out in a jacketed kettle through which a coolant (e.g., tap water) is circulated to effect the purpose of abstracting heat generated by the mechanical agitation and crystallization of the mass. One suitable jacketed vessel is known as a stehling tank.

Following prolonged agitation, the concentrate may be stored, added directly to a comestible mixture such as bread dough, or physically blended with an edible oil to produce a stable shortening. The latter procedure was employed in the following examples, specifically physically blending the emulsifier concentrate with soybean oil in the proportion of one part concentrate to about 5 parts oil. This blend was then used in the preparation of certain bread mixes. It is, of course, understood that the concentrate has applications as an emulsifying agent other than bread, although a principal utility is in the preparation of bread and other yeast-raised products. Edible oils that the concentrate can be mixed with include vegetable and mineral oils. Hydrogenated vegetable oils other than soybean oil can be employed.

After preparation of the bread mixes and baking, in the following Examples, the resulting bread loaves were evaluated using certain standard tests, namely: determination of specific volume in cubic centimeters per gram, the higher the specific volume the more desirable the bread; percent shock loss; bread score; and Instron Reading. The percent shock loss is a measurement of the percentage loss in specific volume when a proofed, unbaked loaf of bread is allowed to slide down a 3-roller conveyor tilted at an angle of 16.5° to a horizontal plane and to collide with a stopper at the bottom of the conveyor. Proofing bread refers to the process wherein unbaked bread is allowed to stand for approximately one hour at 100° F, relative humidity of 85–100%, and to rise. The lower the percentage of shock loss the more desirable is the bread. Bread score is an overall evaluation of a baked loaf of bread wherein a number is assigned to the bread, with 100 being a perfect score, 80 or lower being unacceptable, 90 being good to excellent. In determining the bread score, consideration is given to the texture of the bread, cellular structure of the crumb (uniformity), break and shred, flavor, odor, taste, volume in cc./gram, and color. The Instron test is a procedure for measuring bread softness or staling at spaced intervals and is conducted on a table model Instron Unit coupled with a strip chart recorder and an integrator. The CB Censor Cell of the Instron has a load range of 0-2000 grams, and the aluminum cylindrical probe was 3 centimeters by 2.5 centimeters. The test sample was produced by placing a test loaf into a bread slicing miter box with slots and slicing the test loaf into 2-inch sections. Softness measurements were conducted on two segments of each loaf which adjoin the center slice in the direction of the closest end. The integrator reading was reported by compressing the crumb to a depth of 0.5 inch at a crosshead rate of 0.5 inch per minute with the probe positioned approximately at the center of the slice and exactly on the testing surface. A value E was obtained as a relative measure of softness of the bread wherein higher values of E reflect a firmer bread product. E is a unit of work or energy calculated from the following formula:

$$E = X/5000\ L\ S$$

wherein
 $E$ = the energy in inch gram
 $L$ = the full-scale load in grams
 $S$ = the rate of compression
 $X$ = the integrated value.
Smaller values of E indicate less staling of the bread.
In the Examples, the following abbreviations may be employed:
 EOM = ethoxylated mono- and diglycerides
 GMO = glycerol monooleate
 SSL = sodium stearoyl-2-lactylate
 SMG = succinylated mono- and diglycerides.

EXAMPLE 1

Two food emulsifier concentrates were produced in accordance with the concepts of the present invention, and were evaluated in continuous mix bread by adding the concentrate to liquid soybean oil and then from that blend preparing a fluid bread shortening. The two emulsifier concentrates were:

A:
 90% glycerol monooleate
 5% sodium stearoyl-2-lactylate
 5% ethoxylated mono- and diglyceride
B:
 40% glycerol monooleate
 30% sodium stearoyl-2-lactylate
 30% ethoxylated mono- and diglyceride.

These two concentrates were compared against liquid soybean oil without any emulsifying agents as a control. The concentrate systems were utilized at a level of 0.5% based upon the weight of the flour in the bread, the total lipid content being about 3.0% based on the weight of the flour. The control used 3.0% oil only. The formulation used for the bread was as follows:

|  |  | Baker's Percentage |
|---|---|---|
| Brew Formula: | Granulated Sugar | 2.00 |
|  | Salt | 2.00 |
|  | Yeast | 3.25 |
|  | Yeast Food | 0.75 |
|  | Water | 65.00 |
|  | KIO$_3$/KBrO$_3$ | 75 p.p.m. |
|  | Sodium Propionate | 0.10 |
| Spike Formula: | Granulated Sugar | 5.00 |
|  | High Heat Milk Solids | 2.00 |

The flour was metered into the bread by a conveyor system at 100% level. The functional results are shown in the following Table 1.

Table 1

|  | A | B | Control |
|---|---|---|---|
| Specific Volume, cc/g | 6.24 | 6.30 | 5.99 |
| Shock Loss, % | 21.3 | 5.6 | 35.1 |
| Bread Score | 84 | 86 | 80 |
| Instron Reading |  |  |  |

Table 1-continued

|  | A | B | Control |
|---|---|---|---|
| 1 day | 18.2 | 17.1 | 14.7 |
| 3 days | 26.0 | 25.6 | 39.3 |
| 7 days | 46.7 | 44.8 | 70.6 |

Both of the concentrates A and B exhibited higher specific volume, less percent shock loss, higher bread score and smaller Instron Readings (softness) after three and seven days than the control. The three- and seven-day readings are those of consequence. Concentrates A and B were substantially equivalent in Instron Readings, but concentrate B exhibited significantly less shock loss than concentrate A, and had a slightly higher specific volume. Concentrate B also had a better bread score. On the basis of shock loss and bread score, concentrate B is the preferred form of the present invention.

The following Table 2 gives solubility or fluidity and viscosity data for varying SSL/EOM-GMO systems, illustrating the functioning of GMO as a carrier. Equal amounts of SSL and EOM were added, varying the proportion of GMO to combined SSL and EOM.

Table 2

| SSL | EOM | GMO | Solubility or Fluidity | Viscosity CPS (70° F) |
|---|---|---|---|---|
| 5% | 5% | 90% | Clear | 170 |
| 10% | 10% | 80% | Clear | 210 |
| 15% | 15% | 70% | Cloudy | 260 |
| 20% | 20% | 60% | Cloudy | 1,250 |
| 25% | 25% | 50% | Cloudy, viscous | 3,100 |
| 30% | 30% | 40% | Cloudy, viscous | 10,000 |

The first and last concentrates, 5/5-90 and 30/30-40, were compared in Table 1. Based on the data of Table 1 and other observations, it can be concluded that the functionality of the cloudy emulsifier concentrates exceeds that of the clear concentrates. In other words, optimum functionality was achieved when the SSL/EOM combination comprised at least 30% of the concentrate.

About 10,000 is the maximum viscosity desired, to retain ease of handling and blending capabilities. The concentrate, 30/30–40, although being at the upper limit with regard to viscosity, is a preferred example as it provides maximum functionality.

EXAMPLE 2

This Example illustrates the importance of the solubility of the glycerol monooleate. This property is essential in maintaining the fluidity of the emulsifier concentrate, which in turn is essential to obtain proper blending of the concentrate in the soybean oil or in a bread mix. In this regard, the following Table 3 compares the fluidity/viscosity of the system sodium stearoyl-2-lactylate (SSL)/ethoxylated mono- and diglyceride (EOM) in a glycerol monooleate carrier (GMO) to the same in a soybean carrier.

Table 3

| Sodium Stearoyl-2-Lactylate-Ethoxylated Mono- and Diglyceride | Glycerol Monooleate | Soybean Oil | Viscosity, CPS (70° F, 24 hours) |
|---|---|---|---|
| 10% | 90% | — | 170 |
| 20% | 80% | — | 210 |
| 30% | 70% | — | 260 |
| 40% | 60% | — | 1,250 |
| 10% | — | 90% | 580 |
| 20% | — | 80% | 1,250 |
| 30% | — | 70% | 10,000+ |

Table 3-continued

| Sodium Stearoyl-2-Lactylate-Ethoxylated Mono- and Diglyceride | Glycerol Monooleate | Soybean Oil | Viscosity, CPS (70° F, 24 hours) |
|---|---|---|---|
| 40% | — | 60% | 10,000+ |

The first three examples of Table 3 are the same as the first three examples of Table 2. The data of Table 3 shows that the glycerol monooleate as a carrier provides improved fluidity and viscosity better than soybean oil.

EXAMPLE 3

Optimum fluidity properties of the SSL/EOM-GMO system are maintained until the ratio of the SSL/EOM exceeds the value of 1, as will be shown in the following Table 4. This Table lists viscosities for varying SSL/EOM ratios with constant GMO content of 40% in the concentrate.

Table 4

| System No. | SSL | EOM | Total SSL/EOM | GMO | Viscosity, CPS at 70° F |
|---|---|---|---|---|---|
| 1 | 10% | 90% | 60% | 40% | 165 |
| 2 | 20% | 80% | 60% | 40% | 475 |
| 3 | 30% | 70% | 60% | 40% | 1,950 |
| 4 | 40% | 60% | 60% | 40% | 4,320 |
| 5 | 50% | 50% | 60% | 40% | 8,100 |
| 6 | 60% | 40% | 60% | 40% | 10,000 |

It is evident from the above data that unacceptable viscosities above 10,000 were obtained as the ratio of SSL to EOM exceeded one.

Acceptable functionality was demonstrated by the first five systems of Table 4 in continuous mix bread. The concentrates were investigated at a level of 0.5% based on the weight of the flour in the bread with a total shortening content (total lipid content of emulsifiers plus soybean oil) of 3.0% based on the weight of the flour. Results of this evaluation are exhibited in Table 5. The bread formulation utilized was the same as that employed in Example 1.

Table 5

| | System | | | | |
|---|---|---|---|---|---|
| | 1 | 2 | 3 | 4 | 5 |
| Specific Volume, cc/g. | 6.45 | 6.39 | 6.30 | 6.25 | 6.31 |
| Shock Loss, % | 0 | 1.4 | 3.5 | 0 | 5.9 |
| Bread Score | 85 | 86 | 87 | 83 | 88 |
| Instron Reading | | | | | |
| 1 day | 17.0 | 15.7 | 16.0 | 15.9 | 13.2(1) |
| 3 days | 27.0 | 27.4 | 26.9 | 34.8(1) | 38.0(1) |
| 7 days | 52.4 | 55.9 | 42.2 | 49.1 | 37.8 |

(1)Measurement taken on 5th day of storage.

Concentrate 5 is similar to concentrate B of Example 1, and the functional properties obtained are nearly the same.

This Table shows that the functional properties can be maintained with varying SSL/EOM ratios in the GMO carrier. No significant differences existed in specific volume, percent shock loss, bread score and Instron Readings at three and seven days between the concentrates, although it can be concluded that with more sodium stearoyl-2-lactylate, up to a 1:1 ratio with ethoxylated mono- and diglyceride, softness after 7 days increased and shock loss was less.

EXAMPLE 4

This Example relates to a fluid emulsifier concentrate for yeast-raised products employing succinylated mono- and diglycerides as the solid phase food emulsifier component. In this Example the following emulsifier concentrate formulations were employed:

| A: | Succinylated mono- and diglycerides (SMG) | 5% |
|---|---|---|
| | Ethoxylated mono- and diglycerides (EOM) | 5% |
| | Glycerol monooleate (GMO) | 90% |
| B: | Succinylated mono- and diglycerides (SMG) | 45% |
| | Ethoxylated mono- and diglycerides (EOM) | 45% |
| | Glycerol monooleate (GMO) | 10% |

The fluid emulsifier concentrates were processed following the same procedure as in Example 1.

Following blending of the emulsifier concentrates in a soybean vegetable oil, the same were added to bread as a bread liquid shortening at the level of 3.0% lipid based on the weight of flour in the bread and 0.5% concentrate based on the weight of the flour. These were compared with a bread mix prepared containing 3% soybean oil and no emulsifier ingredients, as a control.

The formulation used for the bread was as follows:

| | | Baker's Percentage |
|---|---|---|
| Brew Formula: | Granulated Sugar | 2.00 |
| | Salt | 2.00 |
| | Yeast | 3.25 |
| | Yeast Food | .75 |
| | Water | 65.00 |
| | KIO$_3$/KBrO$_3$ | 75 p.p.m. |
| | Sodium Propionate | 0.10 |
| Spike Formula: | Granulated Sugar | 5.00 |
| | High Heat Milk Solids | 2.00 |

Table 6

| | A | B | Control |
|---|---|---|---|
| Specific Volume, cc/g | 6.43 | 6.35 | 5.99 |
| Shock Loss, % | 30.1 | 8.3 | 35.1 |
| Bread Score | 84 | 87 | 80 |
| Instron Reading | | | |
| 1 day | 18.0 | 12.9 | 14.7 |
| 3 days | 30.6 | 31.1* | 39.3 |
| 7 days | 54.0 | 46.8 | 70.6 |

*Measurement taken on 4th day of storage.

From the above data, it is apparent that the 5/5-90 concentrate A had a much higher percent shock loss than the 45/45-10 concentrate B, nearly that of the control. A significant difference also existed in the 7th day Instron Reading. Thus, the 45/45-10 concentrate B is the preferred form of the present invention.

The following Table 7 shows fluidity/viscosity properties of various SMG/EOM-GMO systems.

Table 7

| SMG | EOM | GMO | Fluidity | Viscosity, CPS (70° F) |
|---|---|---|---|---|
| 5% | 5% | 90% | Clear Fluid | 150 |
| 10% | 10% | 80% | Clear Fluid | 160 |
| 15% | 15% | 70% | Clear Fluid | 200 |
| 20% | 20% | 60% | Clear Fluid | 220 |
| 25% | 25% | 50% | Fluid, Cloudy | 650 |
| 30% | 30% | 40% | Fluid, Cloudy | 1,380 |
| 35% | 35% | 30% | Fluid, Cloudy | 2,100 |
| 40% | 40% | 20% | Fluid, Cloudy | 5,700 |
| 45% | 45% | 10% | Semi-Fluid, Cloudy | 10,000 |

In the above Table, the first and last examples correspond with concentrates A and B of Table 6. From the above Table, it can be seen that the 5/5-90 concentrate was a clear, thin fluid whereas the 45/45-10 concentrate was a cloudy, pumpable semi-fluid. As with the concentrates of Example 1, it was concluded based on the data of Table 7 and other observations, that the functionality of the cloudy concentrates exceeds that of the clear concentrates. Above 45/45-10, i.e. where the glycerol monooleate concentration is less than 10%, the concentrate becomes plastic and thus is insufficiently fluid. The optimum proportions with regard to both functionality and fluidity are thus in the 45/45-10 proportions, or at that point where the SMG/EOM are present in sufficient amounts to achieve a cloudy suspension which is semi-fluid but still pumpable.

EXAMPLE 5

In this example, the viscosity of SMG/EOM in GMO is compared with the viscosity of these emulsifiers (the SMG and EOM) in soybean oil (S/B).

Table 8

| SMG-EOM | S GMO | S/B | Viscosity, CPS (70° F, 24 hours) |
|---|---|---|---|
| 10% | 90% | — | 150 |
| 20% | 80% | — | 160 |
| 30% | 70% | — | 200 |
| 40% | 60% | — | 220 |
| 50% | 50% | — | 650 |
| 60% | 40% | — | 1,380 |
| 10% | — | 90% | 150 |
| 20% | — | 80% | 760 |
| 30% | — | 70% | 550 |
| 40% | — | 60% | 920 |
| 50% | — | 50% | 4,500 |
| 60% | — | 40% | 10,000+ |

As in Example 2, the fluidity if much higher in the GMO-containing systems.

EXAMPLE 6

The fluidity property of the SMG-EOM-GMO system is maintained until the ratio of SMG/EOM exceeds the value of 1.5. Excellent functional properties are observed in concentrate systems with varying SMG-EOM ratios in the GMO carrier. Table 9 shows viscosities for different SMG-EOM ratios with constant GMO control of 10 percent in the concentrate.

Table 9

| System No. | SMG | EOM | Total SMG-EOM | GMO | Viscosity, CPS at 70° F |
|---|---|---|---|---|---|
| 1 | 10% | 90% | 90% | 10% | 185 |
| 2 | 20% | 80% | 90% | 10% | 215 |
| 3 | 30% | 70% | 90% | 10% | 1,490 |
| 4 | 40% | 60% | 90% | 10% | 2,650 |
| 5 | 50% | 50% | 90% | 10% | 9,875 |
| 6 | 60% | 40% | 90% | 10% | 9,900 |
| 7 | 70% | 30% | 90% | 10% | 10,000+ |

Acceptable functionality was demonstrated by the systems in Table 9 in continuous mix bread. The concentrates were investigated at 0.5% basis flour with a total shortening content of 3.0% basis flour. Results are exhibited in Table 10. Bread formulation utilized is the same as previously identified on page 19.

Table 10

| | System | | | | | | |
|---|---|---|---|---|---|---|---|
| | 1 | 2 | 3 | 4 | 5 | 6 | 7 |
| Specific Volume, cc/g | 6.23 | 6.13 | 6.15 | — | 6.61 | 6.05 | 6.20 |
| Shock Loss, % | 0 | 0.8 | 0.3 | — | 0.9 | 0 | 1.9 |
| Bread Score | 83 | 85 | 83 | — | 91 | 83 | 86 |
| Instron Reading | | | | | | | |
| 1 day | 21.3 | 15.3 | 20.8 | — | 15.4 | 12.7 | 13.0 |
| 3 days | 41.3 | 31.6 | 26.9 | — | 25.4 | 26.6 | 23.6 |

Table 10-continued

| | System | | | | | | |
|---|---|---|---|---|---|---|---|
| | 1 | 2 | 3 | 4 | 5 | 6 | 7 |
| 7 days | 82.7 | 54.4 | 49.7 | — | 58.0 | 41.1 | 35.9 |

Although only slight differences in the functionality of the formulations existed, optimum results in terms of shock loss and anti-staling properties occurred with SMG contents of 20% (run 2) or more based on the weight of SMG and EOM.

The following Table summarizes pertinent data as to preferred proportions in accordance with the concepts of the present invention, set forth in the above Examples.

Table 11

| Data | GMO | EOM | SSL | SMG | SSL/s EOM | SMG/ EOM |
|---|---|---|---|---|---|---|
| Example 1 | 40 | 30 | 30 | | | |
| Table 2 | 70 | 15 | 15 | | | |
| Table 4 | 40 | 36(90)* 20(50) | 4(10) 20(50) | | 1/9 | 1/1 |
| Example 4 | 10 | 45 | | 45 | | |
| Table 7 | 50 | 25 | | 25 | | |
| Tables 9 & 10 | 10 | 36(40)* 72(80) | | 54(60) 18(20) | | 1½/1 1/4 |

What is claimed is:

1. A temperature stable fluent food emulsifier concentrate for yeast-raised products, to provide improved dough conditioning and anti-staling properties, consisting essentially of a normally liquid partial glycerol ester food emulsifier vehicle in which is stably dispersed an ethoxylated fatty acid ester and a solid phase betacrystalline food emulsifier component, said concentrate being mechanically dispersible into a comestible mixture for the emulsification thereof, the proportions of ingredients being about 10 to about 70% liquid partial glycerol ester, about 15 to about 72% ethoxylated fatty acid ester and about 4 to about 54% solid phase beta-crystalline food emulsifier.

2. The concentrate of claim 1 prepared by the steps of physically blending the concentrate ingredients at an elevated temperature sufficient to form a substantially homogeneous melt and then cooling said melt and subjecting the same to mild agitation for a sufficient time and at a temperature to develop beta-crystallization.

3. The concentrate of claim 2 wherein said ethoxylated fatty acid esters are ethoxylated esters of mono- and diglycerides or ethoxylated sorbitol derived esters, and said solid phase food emulsifier component is a succinylated mono- and diglyceride or the alkali or alkaline earth metal salt of an acyl lactylate, the proportions of concentrate components being such as to produce a fluid cloudy suspension.

4. The concentrate of claim 3 employing the following concentrate ingredients:
glycerol monooleate;
ethoxylated mono- and diglycerides; and
alkali or alkaline earth metal salt of an acyl lactylate.

5. The concentrate of claim 3 employing the following ingredients:
glycerol monooleate;
ethoxylated mono- and diglycerides; and
succinylated mono- and diglycerides.

6. The concentrate of claim 3 wherein said liquid glycerol ester is glycerol monooleate.

7. The concentrate of claim 6 having the following formulation:

about 40–70 weight percent glycerol monooleate;

about 15–36 weight percent ethoxylated mono- and diglycerides; and about 4–30 weight percent alkali or alkaline earth metal salt of an acyl lactylate.

8. The concentrate of claim 7 wherein the ratio of lactylate salt to ethoxylated mono- and diglycerides is not in excess of about one.

9. The concentrate of claim 6 having the following formulation:

about 10–50 weight percent glycerol monooleate;

about 25–72 weight percent ethoxylated mono- and diglycerides; and about 18–54 weight percent succinylated mono- and diglycerides.

10. The concentrate of claim 9 wherein the ratio of succinylated mono- and diglycerides to ethoxylated mono- and diglycerides is not in excess of about one and one-half.

11. A fluent food emulsifier concentrate comprising about 40% liquid glycerol monooleate vehicle in which is stably dispersed about 30% ethoxylated mono- and diglycerides and about 30% sodium stearoyl-2-lactylate, said concentrate being mechanically dispersible into a comestible mixture for the emulsification thereof.

12. A fluent food emulsifier concentrate comprising about 10% liquid glycerol monooleate vehicle in which is stably dispersed about 45% ethoxylated mono- and diglycerides and about 45% of succinylated mono- and diglycerides, said concentrate being mechanically dispersible into a comestible mixture for the emulsification thereof.

13. The concentrate of claim 11 added to a liquid vegetable oil in the preparation of a shortening comprising approximately 20% of the weight of the shortening.

14. The concentrate of claim 12 added to a liquid vegetable oil in the preparation of a shortening comprising approximately 20% of the weight of the shortening.

15. The concentrate of claim 1 prepared by the steps of physically blending the concentrate ingredients at a temperature of about 130–150° F sufficient to form a substantially homogeneous melt, and then subjecting said melt successively to quick chilling in a first cooling zone having cooling capabilities to initiate beta-crystallization, to mild agitation in a holding zone for a time period sufficient to promote further beta-crystallization, the exit temperature in said holding zone being about 70–100° F, the exit temperature in the cooling zone being sufficiently low to achieve said holding zone exit temperature, and then subjecting said concentrate to prolonged agitation at a relatively constant temperature until beta-crystallization is substantially complete.

16. A process for preparing the lipid composition of claim 1 which comprises establishing a melt of said preponderantly betaphase forming, normally crystalline food emulsifier; said food grade, normally liquid partial glycerol ester; and said ethoxylated fatty acid ester in the proportions stated;

nucleating said melt by rapid, indirect cooling; and subjecting the nucleated melt to mild agitation for a prolonged period until a stable dispersion of beta-phase crystals dispersed in liquid vehicle develops.

17. The process of claim 16 wherein said melt comprises on a weight basis about 10 to about 70 weight percent liquid partial glycerol ester; about 15–72 weight percent ethoxylated fatty acid ester; the remainder being essentially normally crystalline food emulsifier; the ratio of normally crystalline food emulsifier to ethoxylated fatty acid ester being not in excess of about 1.5.

18. The process of claim 16 wherein said melt comprises about 40–70 weight percent glycerol monooleate;

about 15–36 weight percent ethoxylated mono- and diglycerides; and about 4–30 weight percent alkali or alkaline earth metal salt of an acyl lactylate.

19. The process of claim 16 wherein said melt comprises about 10–50 weight percent glycerol monooleate;

about 25–72 weight percent ethoxylated mono- and diglycerides; and about 18–54 weight percent succinylated mono- and diglycerides.

20. A method for preparing a stable shortening comprising blending the concentrate of claim 1 with an edible oil.

21. A method for preparing a stable shortening comprising blending the concentrate of claim 3 with a liquid oil wherein said concentrate comprises approximately 20% by weight of the weight of the shortening.

22. The method of claim 21 wherein said oil is a soybean oil.

* * * * *

UNITED STATES PATENT AND TRADEMARK OFFICE
CERTIFICATE OF CORRECTION

PATENT NO. : 4,137,338
DATED : January 30, 1979
INVENTOR(S) : Ilija Gawrilow

It is certified that error appears in the above-identified patent and that said Letters Patent are hereby corrected as shown below:

Column 5, line 50, change "liquify" to --liquefy--.
Column 9, Table 4, last line, change "10,000" to --10,000+--.
Column 11, Table 8, delete "S" above "GMO". Column 12, Table 11, in the heading, delete "s" after "SSL/"; after Table 11, insert --*The numbers in parentheses are those actually presented in the Table, whereas those outside the parentheses are based on the entire weight of the concentrate.--

Signed and Sealed this

Nineteenth Day of June 1979

[SEAL]

Attest:

RUTH C. MASON
Attesting Officer

DONALD W. BANNER
Commissioner of Patents and Trademarks